(12) United States Patent
Walsh

(10) Patent No.: US 8,038,075 B1
(45) Date of Patent: Oct. 18, 2011

(54) AIR DAMPER BALANCING SYSTEM AND METHOD

(76) Inventor: Emmet M. Walsh, Stone Mountain, GA (US)

( * ) Notice: Subject to any disclaimer, the term of this patent is extended or adjusted under 35 U.S.C. 154(b) by 446 days.

(21) Appl. No.: 12/182,107

(22) Filed: Jul. 29, 2008

Related U.S. Application Data

(63) Continuation-in-part of application No. 11/140,307, filed on May 31, 2005, now abandoned.

(60) Provisional application No. 60/578,222, filed on Jun. 8, 2004.

(51) Int. Cl.
*F24D 19/10* (2006.01)
*F24F 7/00* (2006.01)
*F24F 3/00* (2006.01)
*G05D 23/00* (2006.01)

(52) U.S. Cl. .......... 236/1 B; 236/49.3; 236/51; 454/254; 165/217

(58) Field of Classification Search ................. 236/49.3, 236/1 B, 51; 62/186; 165/205, 212, 217; 454/254, 256, 333, 229
See application file for complete search history.

(56) References Cited

U.S. PATENT DOCUMENTS

| | | | |
|---|---|---|---|
| 2,729,114 A | 1/1956 | Young | |
| 5,169,121 A | 12/1992 | Blanco | |
| 5,259,411 A | 11/1993 | Guzorek | |
| 5,341,988 A | 8/1994 | Rein | |
| 5,348,078 A * | 9/1994 | Dushane et al. | 165/209 |
| 5,450,999 A * | 9/1995 | Scholten et al. | 236/49.3 |
| 5,467,919 A | 11/1995 | Tamblyn | |
| 5,810,245 A * | 9/1998 | Heitman et al. | 236/49.3 |
| 5,860,593 A | 1/1999 | Heinle | |
| 6,629,886 B1 * | 10/2003 | Estepp | 454/229 |
| 6,719,623 B1 | 4/2004 | Kodaveridan | |
| 2005/0087614 A1 | 4/2005 | Ruise | |
| 2006/0071087 A1 * | 4/2006 | Kates | 236/1 B |

OTHER PUBLICATIONS

Johnson Controls, Using the VMA1400 Balancing Tool (VBT) Software, Nov. 1, 2001.
Johnson Controls, Air Handling Unit (AHU) Controller Aug. 1999.
Johnson Controls, Zone Bus/N2 Bus Interface Converter Sep. 2003.
DuroZone, Designed for Comfort, 2001, Duro Dyne Corporation, Pages (See Accessories p. 1), http://www.retrozone.com/images/durozone-1.pdf.
Johnson Controls, Variable Air vol. (VAV) Controller, 1997, Johnson Controls, Inc pp. 1-91.
Johnson Controls, Controller Access, 2002, Johnson Controls, Inc., pp. 1-21.

* cited by examiner

*Primary Examiner* — Chen Wen Jiang
(74) *Attorney, Agent, or Firm* — Intellectual Property Center, LLC; Arthur K. Shaffer

(57) ABSTRACT

The present invention provides a system and method for manually balancing the volume of air supplied through at least one duct to a conditioned space the system including a damper rotatably mounted within the air duct by a damper shaft having a first and second ends, an electronic pulse actuator responsive to an electronic pulse being associated with the first end, a housing associated with the electronic pulse actuator is generally adapted for operably connecting the electronic pulse actuator to the air duct and a remote positioning unit in electric communication with the electronic pulse actuator where the damper is rotated between an open and a closed position for manually balancing the conditioned space to receive the desired volume of air.

13 Claims, 4 Drawing Sheets

AIR DAMPER BALANCING SYSTEM AND METHOD

CROSS-REFERENCE TO RELATED APPLICATION

This application is a continuation in part of U.S. patent application Ser. No. 11/140,307 filed on May 31, 2005 now abandoned which claims the benefit of the prior filed U.S. provisional application No. 60/578,222 filed on Jun. 8, 2004 which is incorporated herein by reference.

FIELD OF THE INVENTION

This invention relates to holders for mechanical devices for HVAC systems within a building. More specifically, the present invention relates to a method and device for controlling and measuring the delivered air to a space using an electronic pulse actuator to deliver the desired amount of air to a space within a building.

BACKGROUND OF THE INVENTION

In standard HVAC systems, air is delivered to a space treated to the desired cooling or heating temperature through a series of ducts, dampers, and registers. HVAC systems are engineered to provide conditioned air for the entire building. In designing these systems engineers calculate the preferred air flow; however when these systems are installed the builders construct the duct network based upon the duct specifications on a series of drawings or blueprints. Often the fabricated system does not conform to the designed system. In addition, sometimes the conditioned space needs are different than originally designed or otherwise need to be adjusted. It would therefore be beneficial to provide a device which balanced the airflow to be delivered to a space in conformity with the designed system or the needs of the space.

Generally air balancing is helpful to ensure the HVAC system is capable of providing design airflows to all system components under maximum airflow conditions and to satisfy specific zone operating conditions. When an air distribution system is installed the entire air distribution system goes through an initial system balancing. This is typically an iterative process where an air flow for each conditioned space is measured, the balancing damper is adjusted and the air flow is measured to determined the result of the adjustment. Typically the damper is located a distance away from the space to be conditioned in a hard to reach area. The balancer must repeatedly travel to the conditioned space to perform a measurement and then travel to the balancing damper to perform an adjustment until the desired volume of air is achieved. Balancing one conditioned space may affect the balancing of another conditioned space, requiring the repeated measurement of additional spaces. This process can take a substantial period of time and energy until the building is balanced. In addition, as the use of a conditioned space changes, or additional spaces are provided, the system must be rebalanced, again requiring a substantial investment. Therefore, there exists a need to facilitate the balancing of an air distribution system.

One method of balancing the damper is to use a mechanical linkage system like the Bowden Control Cable. This system consists of a series of mechanical linkages and a lever mechanically fastened to the damper with a cable having a wire inside. In addition, the system consists of a rack and pinion screw drive. The screw drive is used to adjust the damper to the desired position, pushing or pulling the wire inside the cable.

However, these systems have several distinct limitations. To function optimally, the cable must not run more than 30 feet from the damper, placing restrictions on the architectural design. Furthermore, the cable should only be installed in a straight line; otherwise the damper is very difficult to adjust. Finally, if the wire runs more than thirty feet or has any curves or bends in its path, the device requires excessive operational force causing increased system breaks and loss of damper control. In addition, if a break does occur, replacement costs will likely be expensive.

In addition, presently there exists several building control systems which provide for automated building management systems which provide a centralized control center for the remote sensing and adjustment of the conditioned space.

There have been prior art attempts to overcome these limitations.

Additionally, some systems provide for variable volume systems based upon thermostatic controls. These systems include the Ruise powered blower (U.S. Published Patent Application 20050087614) which consists of both a motorized damper and blower placed into a vent. These connect to a permanent thermostat that uses the combination of damper and blower to control the temperature in each room. The damper and blower engage when the room's air needs to be conditioned and turn off when the room has reached the desired temperature. This system also has limitations.

Some building control systems, including Rein (U.S. Pat. No. 5,341,988) attempt to condition spaces with a hierarchical control system based upon multiple sensors including thermostatic sensors located within a conditioned space and located external to the space to be conditioned. These systems are often complex and expensive. Configuring the system can require significant expenses in time, configuration, installation and commissioning. In addition, large buildings are susceptible to installation errors or changes made during fabrication and installation. Prior to operation and after installation, even with an automated building control system, each conditioned space must often be balanced by physically traveling to the space to be conditioned, measurements being taken and adjustments being made to ensure the correct balancing damper is properly configured and associated with the correct conditioned space. Because hierarchical control systems still require commissioning and balancing and because of the excessive cost associated with the design and implementation, there is still a benefit to a simple easy to use, manual balancing system which provides the desired quantity of air to the conditioned space.

Several attempts at providing a quantity of air to the conditioned space include providing an electrically wired motorized damper for adjusting the volume of air delivered to the space. However, in addition to the increased costs, hardwiring the damper to the power source requires additional electrical circuits, possible points of failure, increased maintenance issues and does not solve the problem of commissioning and implementing the HVAC system to provide the proper quantity of air to the conditioned space.

Another common attempt to provide a volume of air to a conditioned space is promoted by Johnson Control Systems. Here, a system of motorized controls including motorized vent dampers is connected and controlled by a centralized computer located at a remote location away from the space to be conditioned. In addition, the control system being part of a larger control system monitors and adjusts many additional control points as part of its climate control duties. While this would seem to be a solution, it also requires the purchase of expensive equipment that would rarely be used and extensive programming to implement and the prior to operation, each conditioned space must be physically visited to confirm proper operation.

Another example of a centralized control system is under Heitman. (U.S. Pat. No. 5,810,245) Flow control valves are interfaced with HVAC ducts at the different ends in adjoining rooms of a structure. A flow control command device, mounted on the wall of the structure, is provided to control the flow of air through the HVAC ducts in response to flow control commands. Flow control commands are wirelessly transmitted to a command decoder and converted to flow control signals. A flow control signal bus connects the flow control signals to the flow control valves. A master thermostat is connected directly to the HVAC system and in series with a slave thermostat. This series thermostat connection causes control of the HVAC system to be determined by the thermostat located in the room that receives the highest air flow. Again, a thermostatic control network is expensive and requires extensive programming to simply supply each vent with the same volume of air.

Tamlyn (U.S. Pat. No. 5,467,919) consists of an air-conditioning system which provides for controlling the flow of conditioned air from a duct to a predetermined location of an occupied area of a building. A fitting is secured at one end of the duct and has a moveable butterfly valve mounted therein for selectively controlling flow of conditioned air therethrough, the fitting include a motor and motor control relay for controlling operation of the valve. An outlet is mounted in association with wall means adjacent the location and spaced from the fitting. A flexible conduit is connected to another end of the fitting means and extends from the fitting means and is connected with the outlet means. A remote signal receiver is in electrical circuit with the motor means and motor control relay and is located to receive a transmitted signal and there is a remote controlled signal transmitter signal compatible with the receiver whereby an occupant in the location may remotely control the flow of conditioned air through the outlet means to the location. This system is again local with the controller able to be manipulated by non-engineers and ignores the consequences of changing one damper without adjusting the others.

Kodaveridan (U.S. Pat. No. 6,719,623) is a device that also manipulates air volume for personal comfort. This device allows a sitting airline passenger to control the direction and volume of the airflow from an overhead air-conditioning nozzle by manipulating a remote control keyboard located near the passenger. The invention allows an individual-supplemental air volume to be introduced into an aircraft cabin by means of individual adjustable air outlets to provide a "local" climate zone distinct from the basic cabin climate. Further, the invention also provides a means of remote passenger manipulation of the individual-supplemental air volume and direction and all from the comfort of the passenger seat.

Each of these systems leaves a need for simple reliable system and method for adjusting a damper using a remote positioning unit in communication with an electronic pulse actuator adapted for receiving an electronic pulse from the remote positioning unit until the desired volume of air is received by the conditioned space.

SUMMARY OF THE INVENTION

The present invention reduces the difficulties and disadvantages of the prior art by providing a simple, easy to use, system and method for manually balancing the volume of air supplied to a conditioned space through at least one air duct, the system comprising a damper rotatably mounted within the air duct by a damper shaft having a first end and a second end opposite said first end; an electronic pulse actuator responsive to an electronic pulse and associated with said first end; a housing associated with said electronic pulse actuator and adapted for operably connecting said electronic pulse actuator to said air duct; and a remote positioning unit in electric communication with said electronic pulse actuator, said remote positioning unit being adapted for selectively positioning said electronic pulse actuator whereby said damper is rotated between an open and a closed position, manually balancing the conditioned space to receive the desired volume of air.

In addition, a method is provided which includes the steps of locating a rotatable damper within an air duct by a damper shaft having a first end and a second end opposite the first end, providing an electronic pulse actuator responsive to an electronic pulse, associating said electronic pulse actuator with said first end, operably connecting said electronic pulse actuator to said air duct for moving said damper between an open and a closed position, and manually balancing the conditioned space to receive the desired volume of air by selectively positioning said electronic pulse actuator with a remote positioning unit in electric communication with said electronic pulse actuator whereby said damper is rotated to the desired position.

DETAILED DESCRIPTION OF THE INVENTION

I. Introduction

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

II. Air Damper Balancing System and Method

Figure 1:
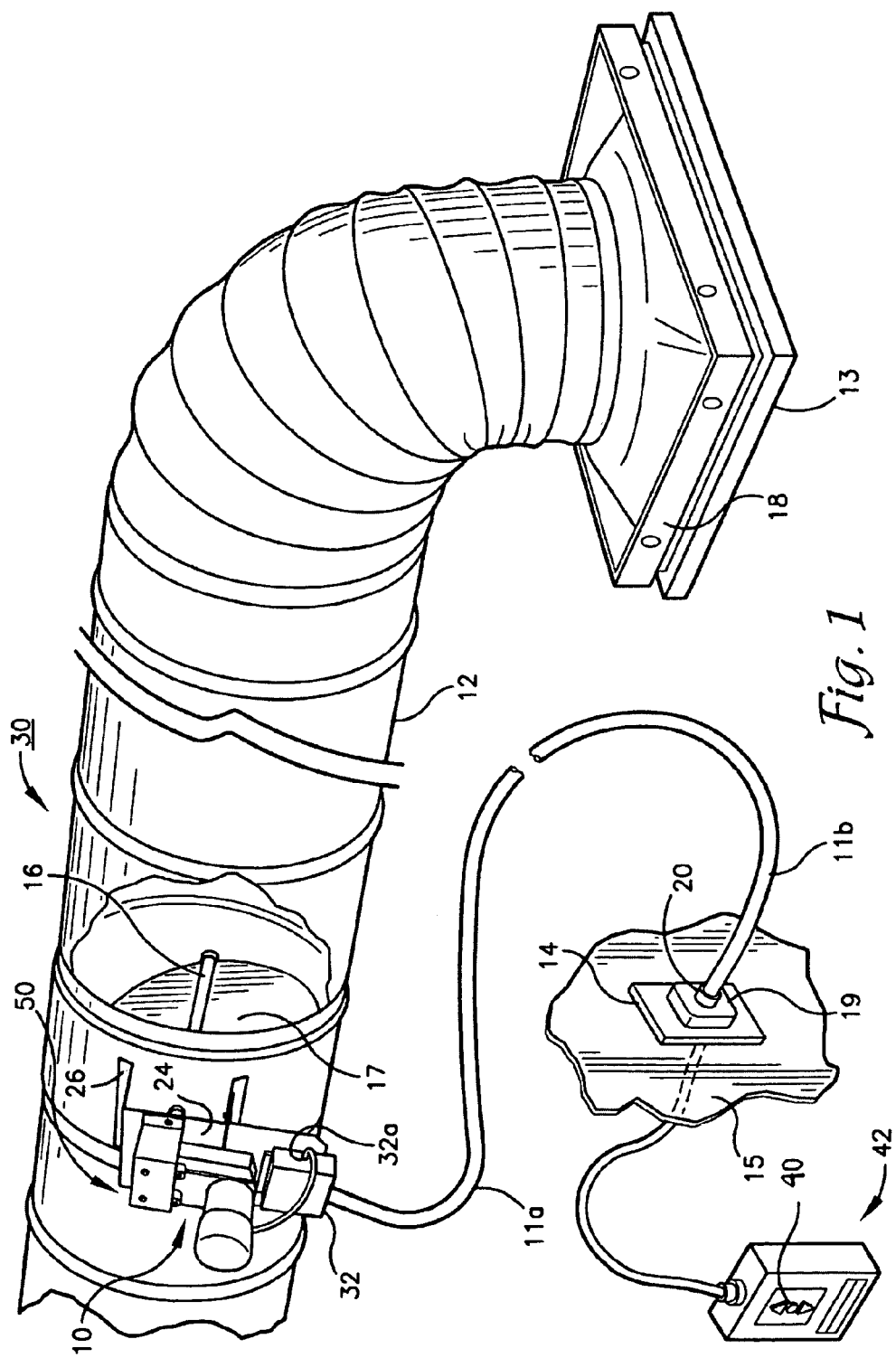
FIG. 1 is a front perspective view of the air damper balancing system.

Referring to FIG. 1, an embodiment of the present invention, an air damper balancing system is generally indicated by reference numeral 30 in association with an air duct 12 extending towards a vent 13 associated with a conditioned space. As illustrated in FIG. 1, the air damper balancing system 30 generally includes a damper 17, an electronic pulse actuator 10 operably connected to the air duct 12 by a housing 50 and a remote positioning unit 42 in electric communication with the electronic pulse actuator 10 associated and adapted for selectively positioning the electronic pulse actuator 10 where the damper 17 is rotated between an open and a closed position.

Figure 3:
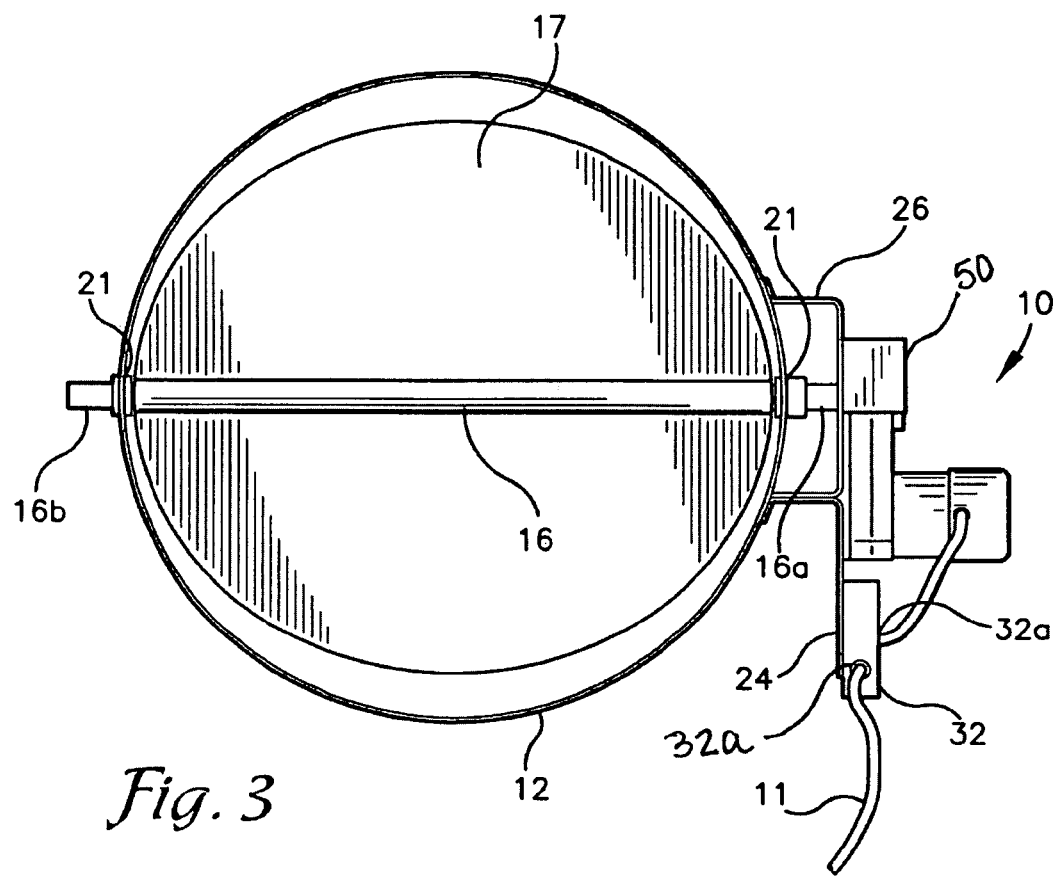
FIG. 3 is an end view of the air damper balancing system associated with an air damper.

As illustrated in FIG. 1, the damper is mounted within the air duct 12 by a damper shaft 16 having a first end 16*a* and a second end 16*b*, illustrated on FIG. 3. The electronic pulse actuator 10 is responsive to an electronic pulse and is generally adapted for pivotal movement of the damper shaft 16 for rotation of the damper 17 within the duct 12 between a closed and an open position. As illustrated in FIG. 1, the electronic pulse actuator 10 is generally associated with the first end 16*a* of the damper shaft 16.

The housing 50 generally includes a mounting plate 24 and a stand-off bracket 26 having a first leg parallel to and spaced from a vertically positioned second leg supporting said mounting plate 24, the electronic pulse actuator 10 being generally secured to the mounting plate 24 while the stand-off bracket 26 positions the electronic pulse actuator 10 for operable movement of the damper 17 by the electronic pulse actuator 10. Generally, the stand-off bracket 26 extends outwardly from the air duct 12 towards the mounting plate 24 which is secured to the electronic pulse actuator 10. The stand-off bracket 26 has sufficient dimensions to support the electronic pulse actuator 10 while the mounting plate 24 is sufficiently sized for receiving the electronic pulse actuator 10. In one embodiment, the stand-off bracket 26 is around 3" wide and supports the mounting plate 24 around 4⅛" above the air duct 12. In addition, the standoff bracket 26 and mounting plate 24 are generally fabricated from a rigidly, bendable, moisture resistant material such as, but not limited to, galvanized metal.

Generally, the pivotal position of the damper 17 relative to the air duct 12 determines the flow of air into the conditioned space. Rotating the damper 17 towards the open position generally increases the flow of air into the space, rotating the damper 17 towards the closed position generally decreases the flow of air into the space. The damper 17 and surrounding air duct 12 may be comprised of a flexible yet rigid material adapted for conveying the desired volume of air to the conditioned space, for example and not by way of limitation, 20 to 24 gauge metal. The damper shaft 16 may be a standard commercial shaft fabricated from solid material like steel, which has a square or circular cross sectional surface for mounting to the damper 17 and may range, but is not limited to, a diameter between ¼" to 2" having sufficient length to extend beyond the diameter of the air duct 12 a sufficient length for receipt by the electronic pulse actuator 10. In addition, the electronic pulse actuator 10 has a sufficient gear ratio adapted for driving the damper 17 closed, which may depend, at least in part, on the diameter of the air duct 12, the diameter of the damper shaft 16, the volume of air and degree of rotation, but may include the range of around 10 to 35 inch pounds of torque.

As illustrated in FIG. 1, a remote positioning unit 42 is illustrated in communication with the electronic pulse actuator 10 via an electric communications cable 11. The remote positioning unit 42 being adapted for selectively positioning the electronic pulse actuator 10 and, as illustrated, includes a selector 40. In operation, the selector 40 may be a two position manual selector switch which transmits an open command or a close command to the electronic pulse actuator 10 over the electric communications cable 11 for selectively positioning the electronic pulse actuator 10. If an open command is transmitted, the damper 17 is rotated towards the open position and if a close command is transmitted the damper 17 is rotated towards the close position. Transmitting open and closed commands, the damper 17 is manually adjusted for balancing the conditioned space to receive the desired volume of air. The remote positioning unit 42 may also be utilized to selectively adjust plural dampers 16 each associated with one electronic pulse actuator 10, individually from the conditioned space or from a single location where multiple connections are located.

As will be further described below, the electronic pulse actuator 10 is illustrated in electric communication with the remote positioning unit 42 in FIG. 1, with one end 11*a* of the electric communications cable 11 associated with the electronic pulse actuator 10 at a housing terminal 32 and another end 11*b* extending towards the conditioned space at a space terminal 34 providing electric access to the remote positioning unit 42.

Figure 2:
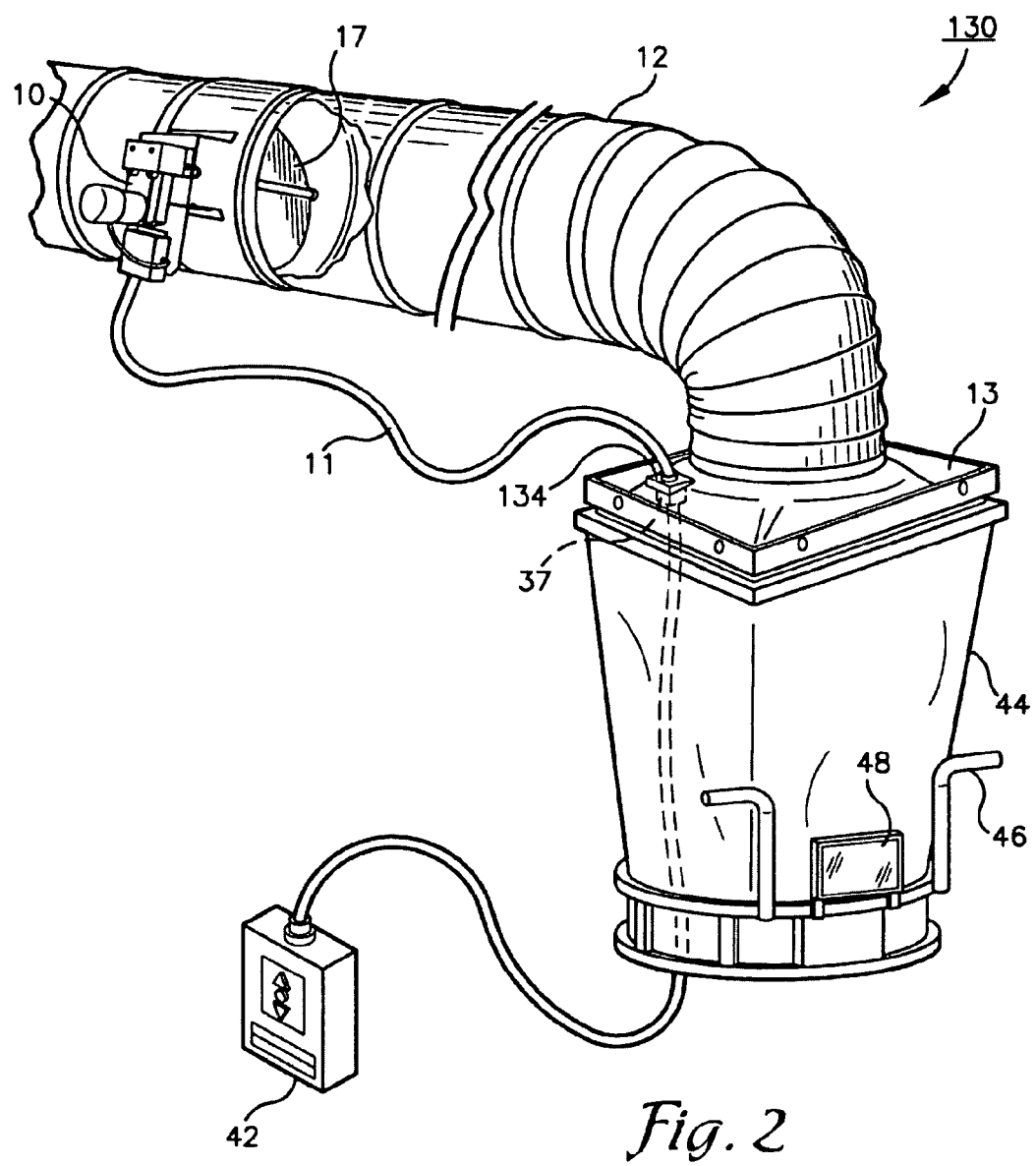
FIG. 2 is a front perspective view of an alternative embodiment of the air damper balancing system.

An alternative embodiment 130 is illustrated in FIG. 2 with an air flow measurement device 44 associated with the remote positioning unit 42 at the conditioned space. As illustrated, the air flow measurement device 44 may be a commercial measuring hood which when placed next to the vent 13 located within the conditioned space, measures the quantity of air flowing into the conditioned space from the vent 13. In addition, the air flow measurement device 44 may optionally provide for hands-free or one-handed operation of the air flow measurement device 44 with a handle 46 or neck strap (not shown) along with a digital or analog display 48 showing the measured volume of the air flow. In this manner, the operator of the remote positioning unit 42, can measure and adjust the quantity of air while manually balancing the air conditioned space, engaging the remote positioning unit 42 to selectively adjust the electronic pulse actuator 10 providing pivotal rotation of the damper 17 until the desired air flow rate is obtained.

As illustrated in FIG. 2, the electric communications cable 11 may alternatively extend from the electronic pulse actuator 10 towards the vent 13 associated with the conditioned space. An alternative space terminal 134 is associated in FIG. 2 with the vent 13 and optionally includes an easy connection terminal such as, but not limited to, a female RJ11 or RJ45 connector. The alternative space terminal 134 is generally associated with the vent 13 and provides electrical access for the remote positioning unit 42 within the conditioned space. As shown, a communications port 37 associated with the remote positioning unit 42 and illustrated on one end of a cable extending outwardly therefrom, extends towards the vent 13 for releasable connection to the alternative space terminal 134 while the airflow measurement device 44 is positioned near the vent 13 for measuring the quantity of air flow.

In this manner, the user may measure the quantity of airflow being delivered the conditioned space while manually balancing the conditioned space. Alternatively, the communication port 37 may be releasably connected to the space terminal 34 associated with a wall or another area near the ceiling, while the air flow measurement device 44 is used to measure the quantity of air flowing into the conditioned space. Although the air flow measurement device 44 is illustrated as a standard flow-hood, other airflow measurement devices may also be utilized.

The interior of the air duct 12 is illustrated in FIG. 3 with the air duct 12 encircling the damper 17, the damper shaft 16 extending laterally therethrough. The damper shaft 16 generally has a first end 16*a* and a second end 16*b* located opposite the first end 16*a*, where the electronic pulse actuator 10 is associated with the first end 16*a*. For example, the electronic pulse actuator 10 may include a mechanical or frictional connection for securing the first end 16*a* for pivotal movement of the damper shaft 16 providing rotatable movement of the damper 17. In addition, the damper shaft 16 is illustrated in FIG. 3 with a pair of bushings 21 retaining the damper shaft 16, a first bushing 21 adapted to receive the first end 16a and a second bushing 21 adapted to receive the second end 16b, the first and second bushings 21 associated with opposite sides of the air duct 12. While the duct 12 and damper 17 are illustrated as being generally circular, the duct 12 and complementary shaped damper 17 may be rectangular or irregularly shaped.

The stand-off bracket 26 is also illustrated extending from the duct 12 with the electronic pulse actuator 10 generally secured to the mounting plate 24. In addition, the housing terminal 32 includes at least one electrical communication connection 32a and is illustrated in FIG. 3 with two, one being electrically connected to the electronic pulse actuator 10 and another connected generally to one end of the electric communications cable 11. The housing terminal 32 being in electric communication with the electronic pulse actuator 10 provides for the transmission of the electronic pulse from the electric communications cable 11 to the electronic pulse actuator 10. The second end 11b of the electric communications cable 11 being generally connected to the space terminal 34 presents an electric communications pathway between the electronic pulse actuator 10 and the remote positioning unit 42 releasably connected to the space terminal 34. In this manner, the electronic pulse may be transmitted from the remote positioning unit 42 to the electronic pulse actuator 10 along the electric communications cable 11. Depending on the operating parameters, the electric communications cable 11 may be standard flexible communications cable like CAT3, CAT4, CAT5, standard telephone wire or may optionally be shielded plenum rated cable. Depending on the operating conditions, the electric communications cable 11 may operably extend up to 1000 feet.

Figure 4:
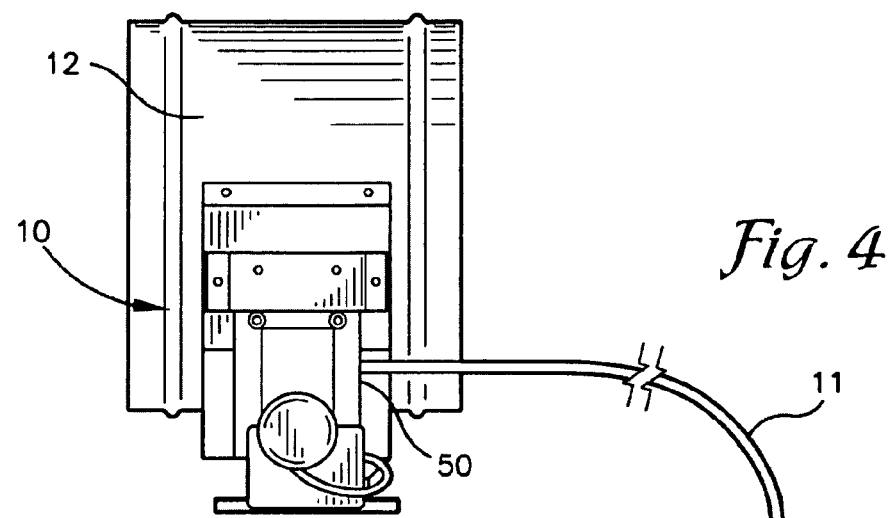
FIG. 4 is a side elevation of the damper balancing system illustrated in FIG. 1.
Figure 5:
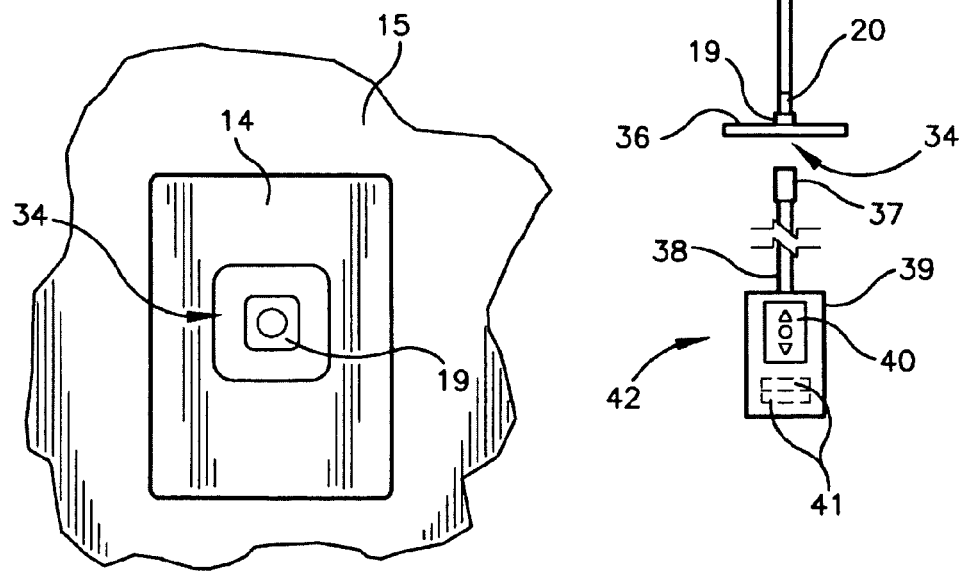
FIG. 5 is a front elevational view of a space terminal.

The power cells 41 associated with the remote positioning unit 42 are illustrated in FIG. 4 along with the selector 40 which may utilize the two-position rocker switch providing an open, a closed and optionally a neutral command. While the communications port 37 is connected to the space terminal 34, the electronic pulse is transmitted along the electric communications cable 11 to the electronic pulse actuator 10. In addition, the selector may provide a neutral position in which no command is transmitted. The communications port 37 of the remote positioning unit 42, as illustrated in FIG. 4, may include a standard communications connection like an RJ11 or an RJ45 connector adapted for releasable receipt by the space terminal 34 associated with the wall or ceiling 15. The rear of the space terminal 34 is illustrated operably connected to the electric communications cable 11 with, for example and not by way of limitation, a male RJ45 connector or coupled to a female RJ45 connector extending rewardly from the space terminal 34. The space terminal including, but not limited to a female RJ11 or RJ45 connection, is illustrated in association with 34 a wall plate cover 14, in FIG. 5, the space terminal 34 being generally associated with the conditioned space and adapted for receipt of the communication port 37 associated with the remote positioning unit 42.

In operation, a method of practicing the present invention may include the steps of locating the rotatable damper 17 within the air duct 12, the rotatable damper 17 rotating about the damper shaft 16 as the shaft 16 is pivoted by the electronic pulse actuator 10 associated with the first end 16a of the damper shaft 16. The electronic pulse actuator 10 being operably connected to the air duct 12, providing movement of the damper 17 between the open and a closed position. As previously indicated, the electronic pulse actuator 10 is generally responsive to the electronic pulse. The conditioned space is then manually balanced to receive the desired volume of air by selectively positioning the electronic pulse actuator 10 with the remote positioning unit 42 in electric communication therewith the damper 17 being rotated to the desired position.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

Having thus described the invention, what is claimed as new and desired to be secured by Letters Patent is as follows:

1. An air balancing system for manually balancing a volume of air supplied through at least one air duct to a conditioned space, said air balancing system comprising:
   a damper rotatably mounted within the air duct by a damper shaft having a first end and a second end opposite said first end;
   an electronic pulse actuator responsive to an electronic pulse and associated with said first end;
   a housing associated with said electronic pulse actuator and adapted for operably connecting said electronic pulse actuator to said air duct;
   said housing further comprising a vertically positioned mounting plate spaced from said air duct by a stand-off bracket having a first leg parallel and spaced from a second leg, said first and second legs supporting said mounting plate;
   said mounting plate securing said electronic pulse actuator and a housing terminal, said electronic pulse actuator being spaced from said housing terminal;
   said housing terminal being in direct electrical communication with said electronic pulse actuator and a space terminal; and
   said space terminal having a communications port in direct electrical communication with a remote positioning unit for transmission of an electronic pulse from the remote positioning unit to the electronic pulse actuator along the electronic communications cable for selectively operating said damper between a partially open and a partially closed position in response to a command from a said remote positioning unit at a space terminal associated with a single zone conditioned space for manually balancing the conditioned space to receive the desired volume of air.

2. The air balancing system of claim 1 further comprising a first bushing adapted to receive said first end and a second bushing adapted to receive said second end wherein said damper shaft is retained by said bushings.

3. The air balancing system of claim 1 further comprising an air flow measurement device associated with said remote positioning unit at said conditioned space, said air flow measurement device being adapted for measuring the volume of air supplied to said conditioned space.

4. The air balancing system of claim 1 wherein said space terminal associated with the conditioned space is adapted to releasably receive said communication port extending from said remote positioning unit.

5. The air balancing system of claim 4 wherein said space terminal is associated with one of a wall and ceiling of the conditioned space.

6. The air balancing system of claim 4 further comprising an electric communications cable extending between said remote positioning unit and said electronic pulse actuator wherein said space terminal is adapted for receiving one end of said electric communications cable whereby said electronic pulse is transmitted from said remote positioning unit to said electronic pulse actuator along said electric communications cable by said space terminal.

7. The air balancing system of claim 1 further comprising an electric communication cable extending between said remote positioning unit and said electronic pulse actuator.

8. The air balancing system of claim 7 wherein said electronic communication cable is a shielded flexible cable adapted for operation within a plenum.

9. The air balancing system of claim 1 further comprising:
an electronic communications cable having a first end and a second end;
said space terminal connected to said first end of said electronic communications cable and associated with the conditioned space, the space terminal being adapted to releasably receive said communications port extending from said remote positioning unit; and
said housing terminal in electric communication with said electronic pulse actuator and connected to said second end of said electronic communications cable, said housing terminal being associated with said actuator mounting plate, whereby said electronic pulse is transmitted by said remote positioning unit from said space terminal along said electric communications cable to said electronic pulse actuator by said housing terminal.

10. An air balancing system for manually balancing a volume of air supplied to a building with at least one conditioned space, the air balancing system including a plurality of ducts, at least one duct extending towards the conditioned space, said air balancing system comprising:
each conditioned space including at least one air flow adjustment mechanism positioned within the duct and including a damper;
each damper shaft associated with the damper having a first end opposite a second end, said first end associated with an electronic pulse actuator responsive to an electronic pulse;
a housing associated with each electronic pulse actuator, each housing including a mounting plate and a stand-off bracket, said housing associated with said electronic pulse actuator secured to said mounting plate, said stand-off bracket operably spacing said mounting plate from the duct;
a remote positioning unit operably connected to each electronic pulse actuator, said remote positioning unit adapted for selectively positioning said electronic pulse actuator whereby said damper is rotated between an open and a closed position providing the desired volume of air to the conditioned space;
at least one electronic communications cable having a first end and a second end;
at least one space terminal connected to said first end of said electronic communications cable and associated with each conditioned space, the space terminal being adapted to releasably receive a communications port extending from said remote positioning unit; and
at least one housing terminal in electric communication with said electronic pulse actuator and connected to said second end of said electronic communications cable, said housing terminal being associated with said actuator mounting plate whereby said electronic pulse is transmitted by said remote positioning unit at said space terminal along said electronic communications cable to said electronic pulse actuator by said housing terminal.

11. The air balancing system of claim 10 further comprising plural electronic pulse actuators in electric communication with each of plural space terminals by complementary electric communications cables each connected to each space terminal grouped together at a remote location.

12. A method for manually balancing the volume of air supplied to a conditioned space comprising the steps of:
locating a rotatable damper within an air duct by a damper shaft having a first end and a second end opposite the first end;
providing an electronic pulse actuator responsive to an electronic pulse;
associating said electronic pulse actuator with said first end;
operably connecting said electronic pulse actuator to said air duct for moving said damper between an open and a closed position; and
manually balancing the conditioned space to receive the desired volume of air by selectively positioning said electronic pulse actuator with a remote positioning unit in electric communication with said electronic pulse actuator, whereby said damper is rotated to the desired position.

13. An air balancing system in combination with an airflow measuring device adapted for measurably adjusting a volume of air delivered to a conditioned space through a duct, said air balancing system comprising:
an air flow adjustment mechanism including a damper having a damper shaft extending through said duct, said damper being moveable from an open to a closed position;
an electronic pulse actuator mounted to said damper shaft by a housing including a mounting plate and a stand-off bracket, said housing associated with said electronic pulse actuator secured to said mounting plate, said stand-off bracket operably spacing said mounting plate from said duct;
an electronic communications cable having a first end in electric communication with said electronic pulse actuator and a second end in electric communication with a remote positioning unit;
said remote positioning unit including a selector operable in a first and a second position, said first position associated with said damper open position, said second position associated with said damper closed position, said remote positioning unit being selectively operated for manually manipulating the volume of air delivered to the conditioned space by transmitting an electronic pulse from said remote positioning unit to said electronic pulse actuator whereby the air flow measurement device indicates the desired volume of air received at the conditioned space.

* * * * *